Nov. 20, 1923.

S. E. HESTAND

SPOKE TIGHTENER

Filed July 7, 1922

1,474,716

Inventor
S. E. Hestand.

By Lacy & Lacy, Attorneys

Patented Nov. 20, 1923.

1,474,716

UNITED STATES PATENT OFFICE.

SAMUEL ERWIN HESTAND, OF COMANCHE, TEXAS.

SPOKE TIGHTENER.

Application filed July 7, 1922. Serial No. 573,342.

*To all whom it may concern:*

Be it known that I, SAMUEL ERWIN HESTAND, a citizen of the United States, residing at Comanche, in the county of Comanche and State of Texas, have invented certain new and useful Improvements in Spoke Tighteners, of which the following is a specification.

This invention has for its object the provision of simple, inexpensive and easily manipulated means whereby the spokes of a wheel may be tightened in the felly and the hub to accommodate shrinkage in the parts and to avoid rattling in the wheel. The device is intended more particularly for application to the wheels of automobiles but may, of course, be applied to any wheels.

In the accompanying drawings—

Figure 1:
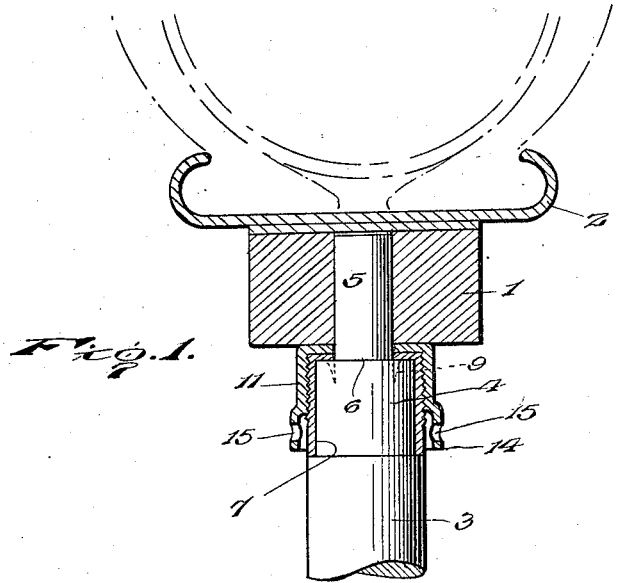
Figure 1 is a sectional elevation of my improved device applied to a portion of a wheel.
Figure 2:
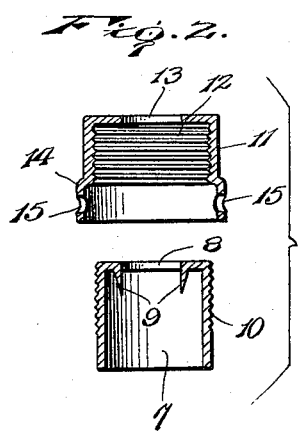
Fig. 2 is a sectional view of the telescopic thimbles.
Figure 3:
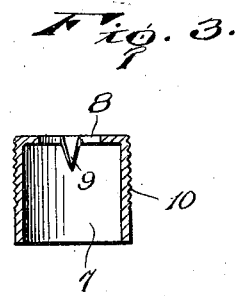
Fig. 3 is a sectional view of the inner thimble taken at right angles to Fig. 2.
Figure 4:
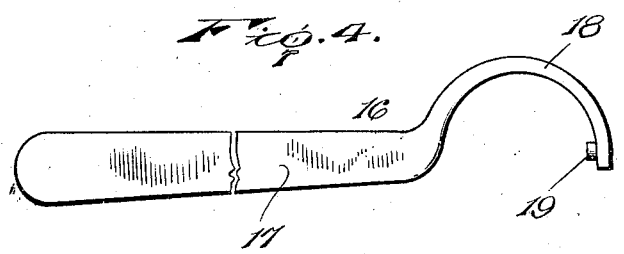
Fig. 4 is a plan view of the spanner by which the device may be adjusted.

In the drawings, the reference numeral 1 indicates a portion of a felly having a wheel rim 2 secured thereon and the reference numeral 3 indicates the end of a spoke having a reduced portion 4 and a tenon 5 projecting axially therefrom to engage in the felly in the usual manner, an annular shoulder 6 being formed around the base of the tenon, as shown in Fig. 1 and as will be readily understood. In carrying out my invention, I employ an inner thimble 7 which is fitted tightly around the reduced portion 4 of the spoke and is provided at its outer end with a central opening 8 whereby the thimble may fit around the tenon. At one or more points around the opening 8, spurs or teeth 9 are provided to project inwardly and embed themselves in the end of the spoke so that rotation of the said thimble upon the spoke will be prevented. The said thimble 7 is exteriorly threaded, as indicated at 10, and the outer thimble 11 is mounted upon the inner thimble and is interiorly threaded, as indicated at 12, so as to be easily secured thereon and adjusted longitudinally thereof. The outer end of the outer thimble 11 is also provided with a central opening 13 to fit around the tenon 5 and the inner end of the thimble is offset, as shown at 14, to provide an annular enlargement or collar having openings 15 formed therethrough at intervals to be engaged by a turning tool.

While any convenient tool may be employed to effect rotation of the outer thimble upon the inner thimble, I provide a spanner 16 having an elongated handle or lever arm 17 and having an arcuate head 18 adapted to partly encircle the collar or offset end 14 of the thimble and provided at its free end with an inwardly projecting lug 19 to engage any one of the openings 15 in an obvious manner.

It will be readily noted that the outer ends of the two thimbles fit between the shoulder 6 on the spoke and the inner circumference of the felly and entirely fill the said space so that the spoke will fit tightly in the felly. Should the parts shrink and looseness and rattling develop in the wheel, the spanner 16 is engaged with the outer thimble and the said thimble is rotated about its longitudinal axis so that it will ride outwardly upon the inner thimble and thereby project beyond the said inner thimble so as to abut the felly and tighten the parts. My device is exceedingly simple and inexpensive and may be readily adjusted by any unskilled person. The inner thimble will be effectually held against rotation by the engagement of the spurs 9 with the end of the spoke and, therefore, rotation of the outer thimble will at once effect a telescopic or longitudinal movement thereof relative to the inner thimble.

Having thus described the invention, what is claimed as new is:

The combination with a spoke having a reduced outer end and provided with a tenon extending axially therefrom, and a felly receiving the tenon, of an inner thimble fitting around the reduced end of the spoke and over the same and provided with inwardly projecting piercing teeth embedding themselves in the end of the spoke, said thimble being exteriorly threaded, and an outer thimble fitting around and over the inner thimble with its outer end abutting the rim around the tenon, said outer thimble being internally threaded to engage the inner thimble and having its inner end annularly offset to be free of the inner thimble and constructed to be engaged by a turning tool.

In testimony whereof I affix my signature.

SAM E. HESTAND. [L. S.]